H. NEUMANN & C. R. ANNETT.
MACHINE FOR CUTTING BUTTER.
APPLICATION FILED SEPT. 30, 1910.
1,018,516.
Patented Feb. 27, 1912.
5 SHEETS—SHEET 4.
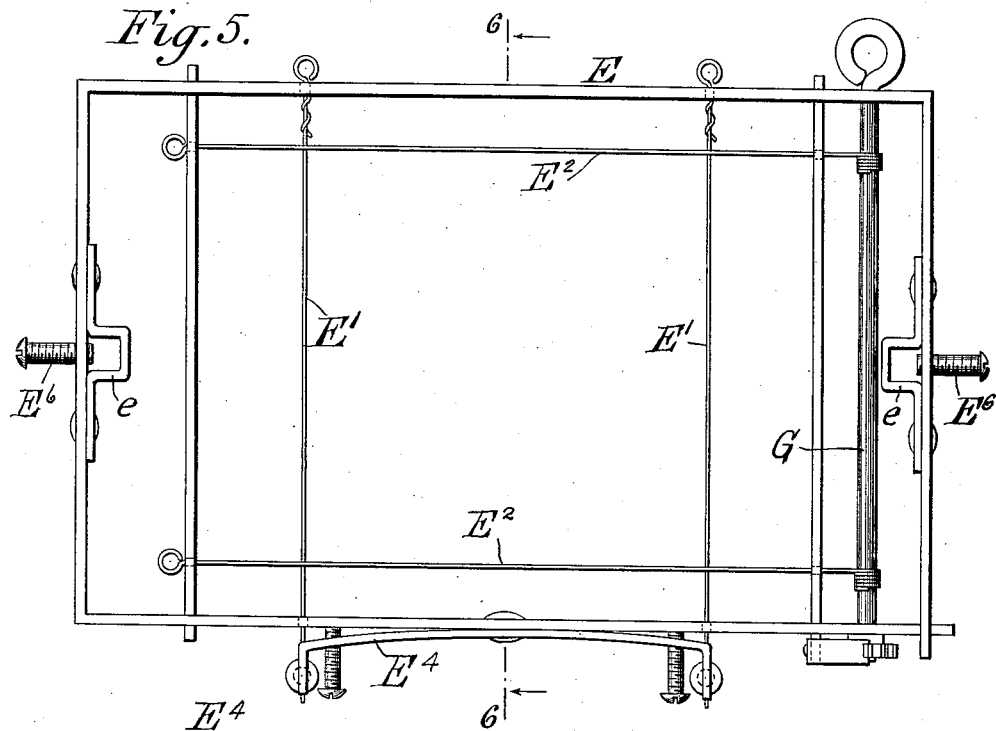
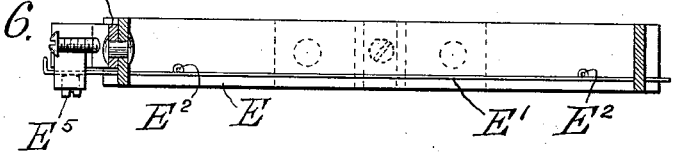
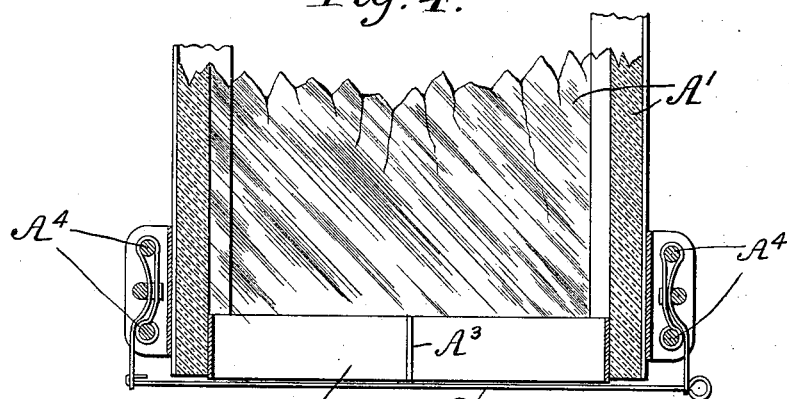

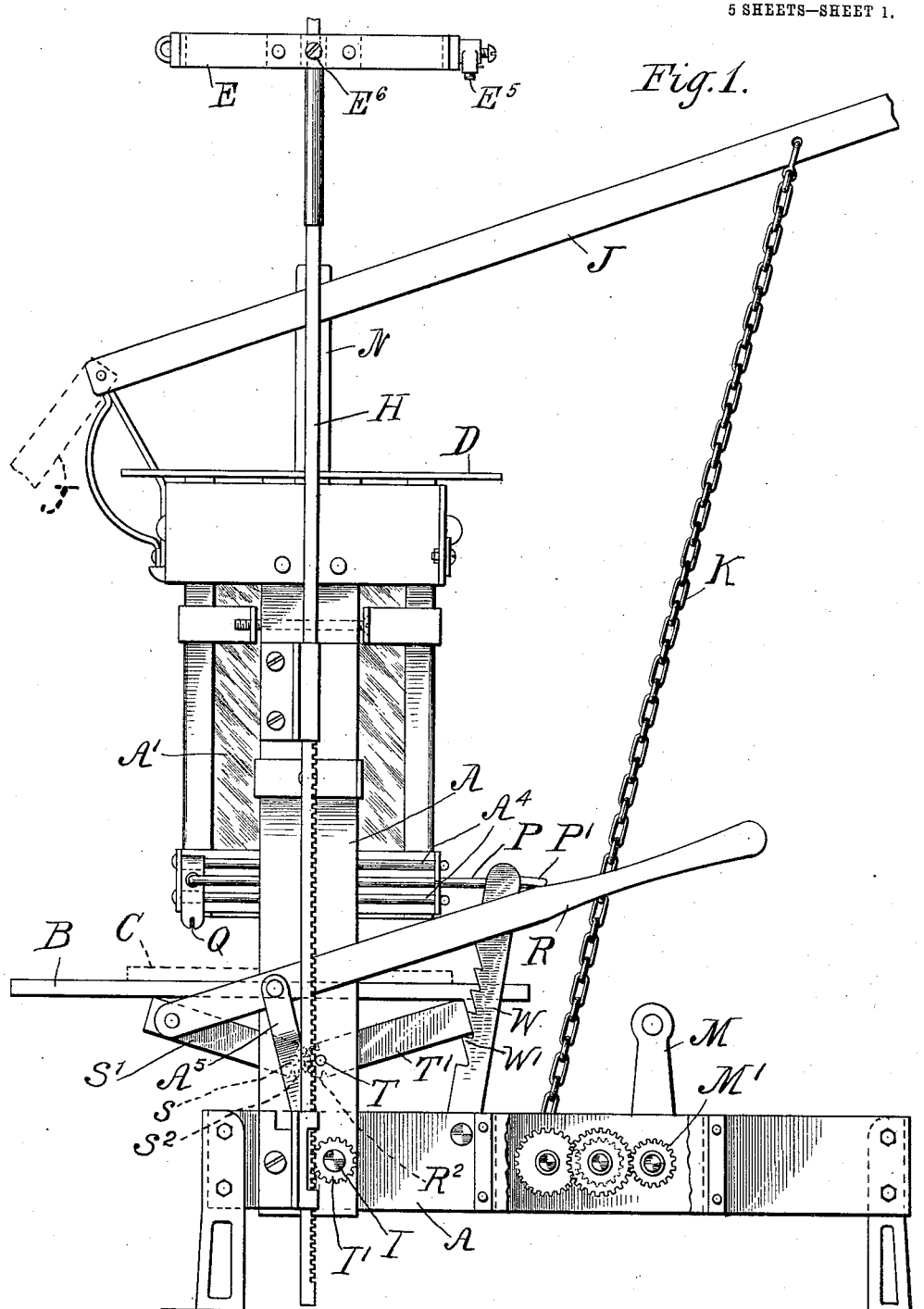

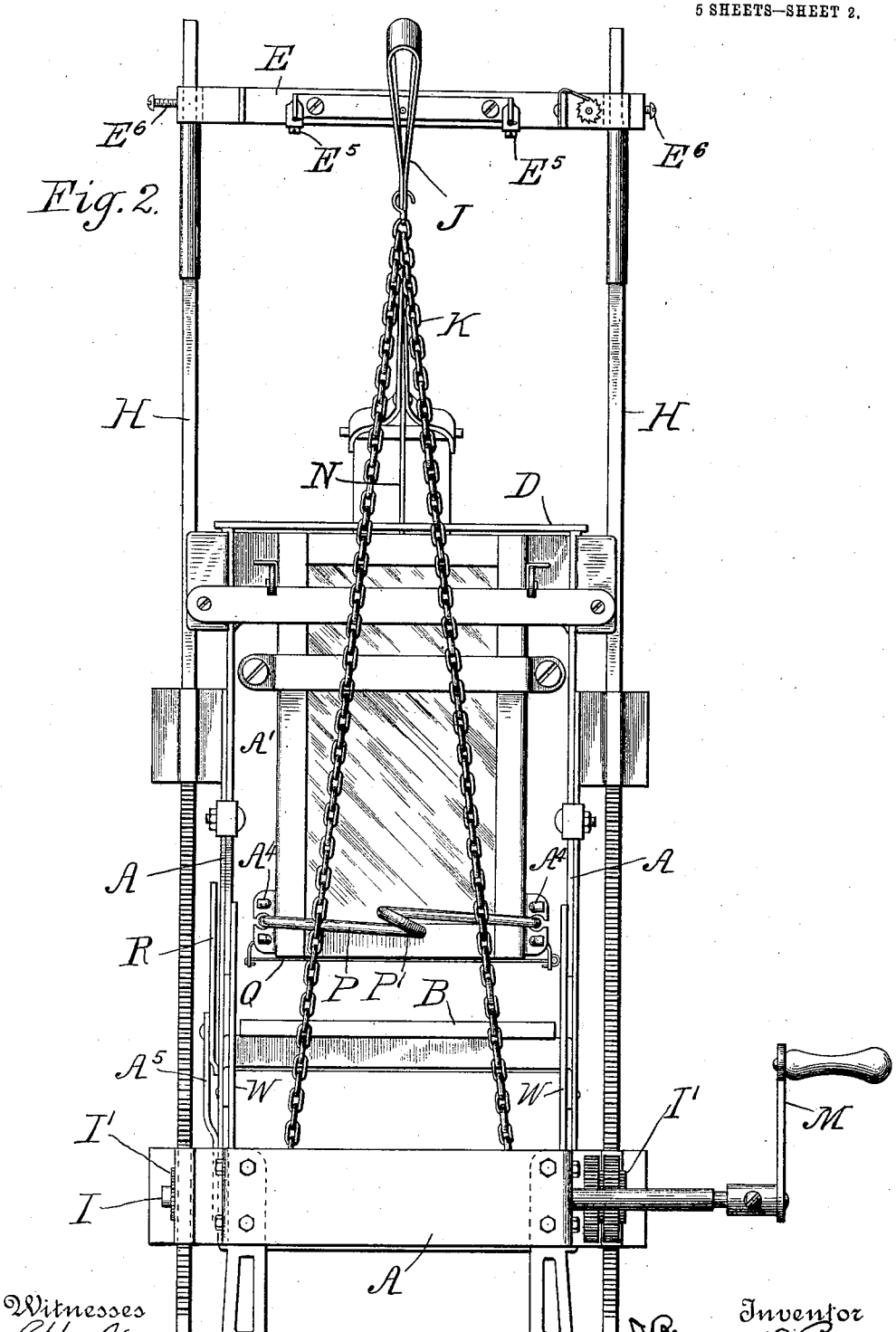

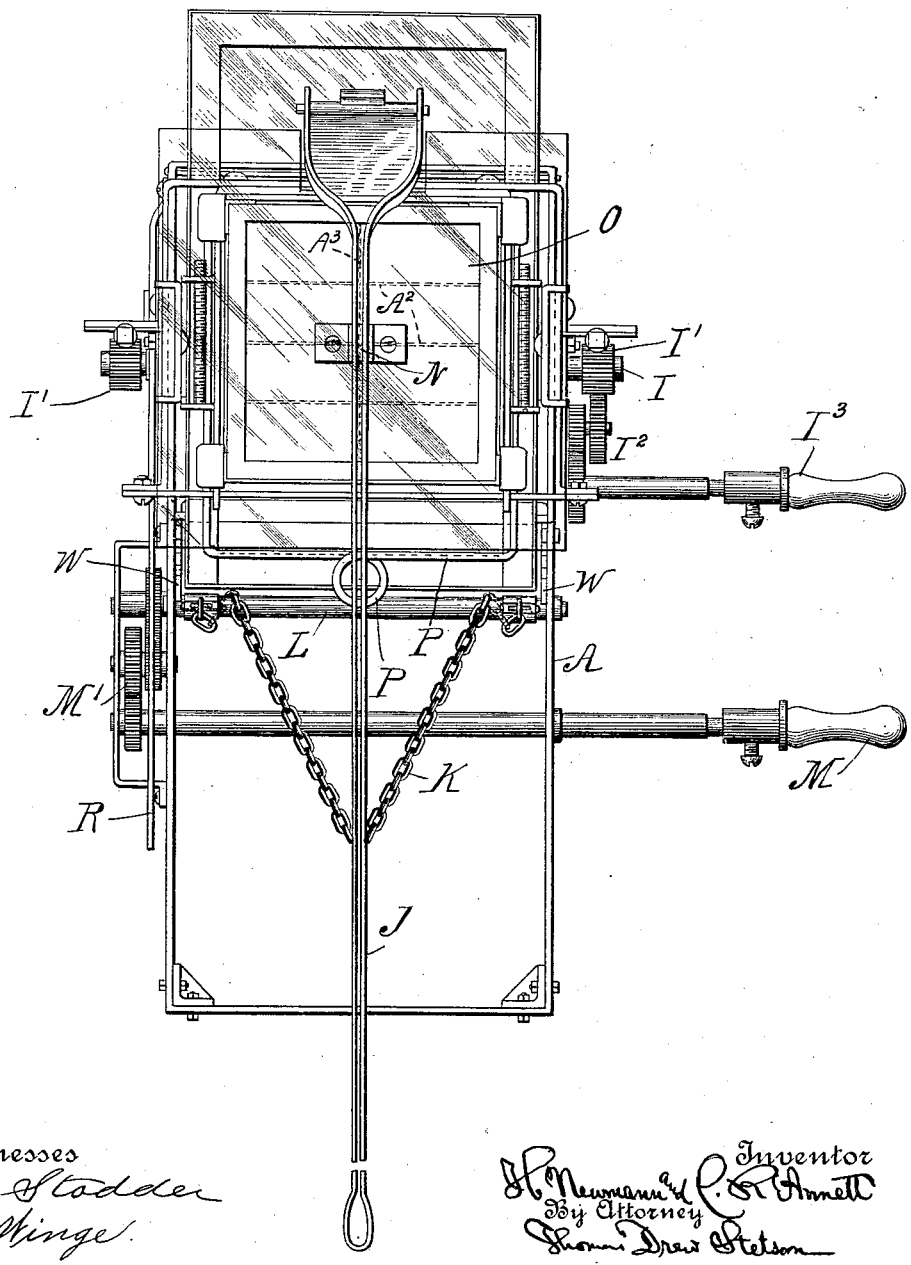

H. NEUMANN & C. R. ANNETT.
MACHINE FOR CUTTING BUTTER.
APPLICATION FILED SEPT. 30, 1910.
1,018,516.
Patented Feb. 27, 1912.
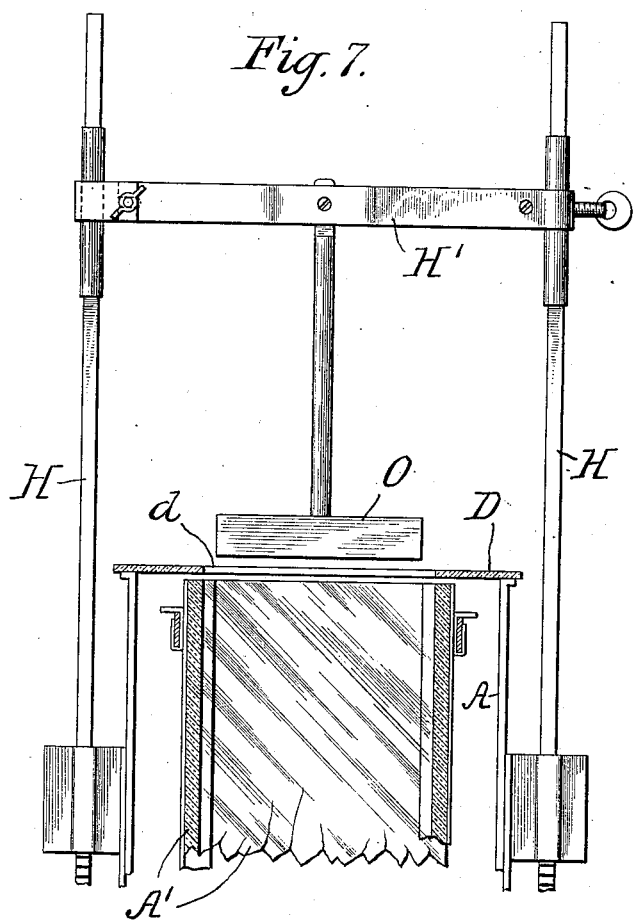
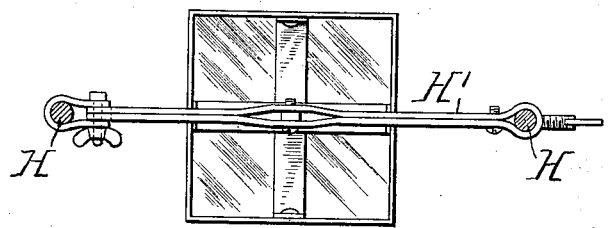

UNITED STATES PATENT OFFICE.

HERMAN NEUMANN AND CHARLES R. ANNETT, OF NEW YORK, N. Y.

MACHINE FOR CUTTING BUTTER.

1,018,516.  Specification of Letters Patent.  Patented Feb. 27, 1912.

Application filed September 30, 1910. Serial No. 584,623.

*To all whom it may concern:*

Be it known that we, HERMAN NEUMANN and CHARLES R. ANNETT, citizens of the United States, residing in the city of New York, in the county and State of New York, have invented a certain new and useful Improvement in Machines for Cutting Butter, of which the following is a specification.

It has become a general practice to divide butter received in firkins of about 60 lbs. each and deliver it to customers in rectangular portions sometimes termed prints of uniform size, one pound, one half pound, or one quarter of a pound. Several efforts have been made to effect the division by machinery. Our machine is of that class and is adapted to do the work better and easier.

We detach the butter from the usual incasing firkin and hold the nearly cylindrical mass upright on a proper support above the box, sometimes termed cup, in which the squared mass of butter is to be received, and while thus held, move downward dividing wires which make the required vertical cuts to square the mass by removing the slabs from the four sides and afterward subdivide the squared mass vertically in successive installments and after each move transversely a single dividing instrument to effect the horizontal divisions. We effect the several movements by the aid of mechanism which gives a purchase, or increase in the force between the hand of the operator and the resistance.

There are further important improvements as will be fully set forth below, and pointed out in the claims to effect the squaring or slabbing. The main mass of the butter sinks by gravity into the cup and is afterward pressed past a set of crossed cutting devices to effect the other necessary vertical cuts.

The following is a description of what we consider the best means of carrying out the invention.

The accompanying drawings form a part of this specification.

Figure 1 is a side view showing the entire machine adjusted in an unusual condition. The parts which separate the waste and those which afterward divide the whole into the desired uniform prints are all in position for work, which does not obtain as usually operated. Fig. 2 is a corresponding front view. Fig. 3 is a corresponding plan view with the slabbing frame omitted. Figs. 4, 5 and 6 are on a larger scale. Fig. 4 is a vertical section of the lower part of the cup, showing the provisions for effecting the vertical cuts by stationary cross knives, and for further effecting the horizontal cuts which detach the several layers of prints, one by one, as they are successively cut. Fig. 5 is a plan view of the slabbing frame detached which serves at the early period to reduce the butter to a rectangular form. Fig. 6 is a section on the line 6—6 in Fig. 5. Fig. 7 is a central vertical section of the box or cup and an elevation of the plunger and cross head. Fig. 8 is a plan view of the plunger and crosshead.

Similar letters and marks of reference indicate corresponding parts in all the figures where they appear.

A is the fixed framework, certain portions being designated when necessary by supernumerals.

A' A' are four sufficiently stout plane sheets of glass supported by metal at the corners and constituting a strong box, which we may sometimes term the "cup." In the bottom of the four-sided box thus constituted are cross knives $A^2$ and $A^3$. The function of these knives is to divide the mass of butter which is forced down through the box or cup and allow it to protrude below the cup in the divided condition.

B is a rising and sinking table held always in a level position below the cup, but capable of being raised and lowered. To regulate the depth of the several lumps of butter produced, we adjust the table at the proper level and force the butter down past the knives $A^2$ and $A^3$ until it rests on a tray of glass C, which is supported on the table. When the butter is thus conditioned, nothing remains but to divide by a horizontal cut and thus separate the lower portion or portions which protrude below the cup. Such division is effected by a single wire extended across and moved horizontally from one side to the other of the mass of butter. The division is now complete. To take away the lumps, we lower the table B and its tray C a little; draw out the tray and its load and carry it away. We supply a fresh tray or the same one after being emptied, and place it similarly upon the table, again exactly adjust the height of the table by a simple movement, again force down the butter past the knives $A^2$ $A^3$; again divide horizontally, again lower the table and remove the tray and repeat until there is not sufficient butter left to form another layer.

The operation thus rapidly outlined possesses elements of importance, and will be again referred to. We have, in attaining the several movements, introduced mechanisms which will require minute description. Beginning with the squaring of the butter, which we shall sometimes refer to as slabbing,—the reducing of it to a square condition from the approximately cylindrical form into which it is molded by the firkin.

D is a horizontal board having an aperture $d$ of rectangular form in its center, only a little more than sufficient to allow the passage of the main central mass of the butter after it is squared (see Fig. 7). Above this we apply temporarily a frame E, see Figs. 1, 2, 5 and 6, across which are stretched wires with provisions for tightening and for facilitating the exchange in case one is broken. E' E' are two parallel wires which extend one way of the frame, and $E^2$ $E^2$ two wires which extend crosswise thereto. These wires determine the horizontal dimensions of the squared mass of butter. The slabs or partially segmental pieces which are liberated by this treatment and held up by the board D, are reserved for subsequent use. The wires E' are each supported directly in the frame E, one end of each being held by an enlargement. The wires $E^2$ are each wound around a sufficiently stout rod or windlass G with provisions for revolving and holding the latter. The free ends of the wires E' are confined by a pinching screw $E^5$ in a notch in a spring $E^4$. The tension of the spring may be tightened by screws $E^5$.

The frame E is provided with a socket $e$ at each end, against each of which is a pinching screw $E^6$. This frame is mounted horizontally over the cup and is moved up and down by the aid of vertically moving side rods H suitably guided, each of which is engaged with the frame E by being received in one of the sockets $e$ and confined by the corresponding pinching screw $E^6$. The lower portion of each of these rods H is formed with teeth, making each rod, in fact, a rack. Each is engaged by corresponding gear wheels I' I' carried on a shaft I supported in the framing and revolved by the aid of gearing $I^2$ and crank $I^3$, (see Fig. 2). Turning the crank $I^3$ in one direction depresses the frame E and effects the slabbing of the butter by detaching a rounded portion on each of four sides and leaving the middle portion exactly square. When the frame E is quite down in contact with the board D, all the parts of the butter are liberated. The central portion, the main body, sinks through the square hole $e$ into the closely fitting space in the interior of the cup A', ready for the next succeeding operation, while the slabs, the four pieces cut off by the slabbing operation, are removed by any convenient means to be otherwise disposed of. Revolving the crank $I^3$ in the opposite direction raises the racks and restores all the slabbing parts to their previous elevation. To proceed further, we remove the separable parts of the slabbing mechanism. The pinching screws $E^6$ are slackened and the frame E lifted off and laid temporarily aside. Next the main lever J which has been previously out of use in the position partly shown in dotted lines in Fig. 1, is swung over into the position shown in strong lines in such figure, and the chain K attached which is ready to be wound on a windlass L driven by gearing M' and a hand crank M. To this main lever is pivoted a link N which connects it to a plunger O. (See Fig. 1). Turning the crank M and its connecting gear in one direction, depresses the plunger O and forces the butter which is in the cup down past the knives $A^2$ $A^3$ and makes the whole set of vertical divisions. Then turning the crank M in the opposite direction, slackens the chain K and allows it to be unhooked from the lever J and then allows the lever to be again momentarily put out of use by again turning it over into the position shown in dotted lines.

It will now be understood that the crank M is turned one revolution, more or less, enough to depress the butter until it bears on the glass tray C shown in dotted lines in Fig. 1. While the plunger is thus depressed or after the pressure thereon has been relaxed a little, the horizontal cut is effected by the following mechanism. P is a horizontal U-shaped frame, see Figs. 2 and 3, supported in fixed guides $A^4$, and capable of being easily reciprocated endwise therein. The closed end is formed with a ring P' which serves as a convenient handle. The other end is open except for a strong slender wire Q extended across at a little lower level. See Fig. 2. After the butter has been depressed until it bears fairly on the tray, and the pressure of the plunger is relaxed, this frame P Q is, by the hand of the operator, moved horizontally so that the wire travels quite across through the mass of butter, and completely divides it horizontally.

It remains to describe the specific mechanism we have devised for raising and lowering the table B. We work by a separate hand lever R pivoted on a relatively fixed center carried on a slightly vibrating link $A^5$. This lever is pivoted, see Fig. 1, to a broad arm S' on a partially revolving shaft S supported in the framing. As the lever R and the arm S' are rocked a similar broad arm T' on a similar shaft T parallel to S receives an equal but opposite motion through stout gear teeth R² and S². The arms S' and T' apply under the table B. W W' is a stepped piece, pivoted below, having its steps W' urged into engagement with the lever T' by a gentle spring not shown. It holds the table firmly up at any of the levels desired.

In all machines of this character it is important to utilize the trimmings which would otherwise be waste, and to deliver the whole firkin of butter in the proper size prints. The segments or slabs, of which there are four, produced by the early steps of each treatment and any other waste butter must be added to the mass which it is to deliver in the form of proper sized prints. When the slabbing has been completed and before the plunger O is brought over and introduced, all the waste may be put into the cup A' so that it will be compressed by the plunger and form all the butter into a homogeneous mass, ready to be all cut alike.

Modifications may be made without departing from the principle or sacrificing the advantages of the invention. It is practicable to operate the plunger, not by the lever, but by the same rack rods H as have just worked the slabbing. Figs. 7 and 8 represent such modification, having a crosshead H' which may be applied and removed at proper intervals, or as shown, may be detached from one of the rods H and partially revolved on the other so as to be out of the way during the slabbing period.

The machine may be made in various sizes and of various materials. We esteem it important to make all the parts which contact with the butter of glass.

We can treat other materials than butter. Soap can evidently be divided by this machine, care being taken to operate while properly softened or preferably before it has ever been allowed to become too hard. Other materials which are naturally too soft, as lard, and ice-cream, may be divided by this machine, taking care to have the temperature or other conditions such that the softness will not defeat the operation.

We claim as our invention:

1. In a machine for cutting butter, the combination with a support for the butter, of means for separating portions of the butter from the mass to give the remainder a predetermined form, cutting devices to subdivide the mass into columns, and provisions for transferring the butter from the separating means to the cutting means, substantially as described.

2. In a machine for cutting butter the combination with provisions for slabbing the butter of a box or cup, cutters mounted therein for dividing the butter into columns and provisions for depressing the butter into the box whereby the central portions and the slabbed portions of the butter may be passed through the box and by the cutters substantially as described.

3. In a machine for cutting butter, the combination with a support for the butter, of means for separating portions of the butter from the mass to give the remainder a rectangular form of a predetermined size, provisions for transferring the butter from the slabbing means to the cutting means, cutting devices arranged to subdivide the butter into uniform columns, and provisions for applying the operating force to effect the several operations successively.

4. In a machine for cutting butter, the combination with slabbing means, and means for dividing the mass into columns, of transversely movable cutting devices arranged to divide the several columns into equal parts.

5. In a butter cutting machine the combination of means for slabbing the butter and means for holding the squared mass in position comprising a cup, a platform resting on said cup and having an aperture adapted to allow the squared mass to descend while the waste is detained, with provisions for dividing the mass vertically and horizontally substantially as described.

6. In a butter-cutting machine, mechanism for detaching the slab material conveying and holding the squared mass in position for the succeeding stages, mechanism for dividing such mass into columns, and mechanism for transversely cutting and detaching such parts in combination with each other and a table arranged to gage the extent of the movement of the butter at each operation.

7. In a butter-cutting machine, mechanism for conveying and holding the squared mass in position for the succeeding stages, mechanism for dividing such mass into columns, and mechanism for transversely cutting and detaching such parts in combination with each other, and with a table arranged to contact with the lower face of the squared mass and thereby gage the extent of the movement of the butter at each operation, and mechanism for changing the level of such table and thus varying the weight of the print at will.

8. In a butter cutting machine, cutting device for separating the waste, means for conveying and holding the butter in combination with a platform for supporting the waste, substantially as described.

Signed at 1767 Broadway, New York city, N. Y., this 28th day of September, 1910.

HERMAN NEUMANN.
CHARLES R. ANNETT.

Witnesses:
D. W. CHILDRESS,
LENA C. MARKHAM.